United States Patent [19]

Garter et al.

[11] 4,253,430
[45] Mar. 3, 1981

[54] INSULATED OIL COOLED PISTON ASSEMBLY

[75] Inventors: Robert F. Garter, Dearborn; Nshan Hamparian, Brighton, both of Mich.

[73] Assignee: General Motors Corporation, Detroit, Mich.

[21] Appl. No.: 2,540

[22] Filed: Jan. 11, 1979

[51] Int. Cl.$^3$ .......................... F01P 1/04; F01P 3/06; F01B 31/08; F02F 3/20
[52] U.S. Cl. ............................ 123/41.38; 123/193 P; 92/176
[58] Field of Search ............... 123/41.16, 41.35, 41.37, 123/41.38, 191 A, 193 P; 92/176

[56] References Cited

U.S. PATENT DOCUMENTS

| | | | |
|---|---|---|---|
| 1,405,887 | 2/1922 | Alt | 92/176 |
| 2,214,891 | 9/1940 | Schrom | 92/176 |
| 2,788,774 | 4/1957 | Chatterton | 123/41.38 |
| 3,616,729 | 11/1971 | Fischer | 92/176 |
| 3,628,511 | 12/1971 | Fischer | 92/176 |
| 4,013,057 | 3/1977 | Guenther | 123/193 P |
| 4,056,044 | 11/1977 | Kamman et al. | 123/41.35 |

Primary Examiner—Craig R. Feinberg
Attorney, Agent, or Firm—Robert J. Outland

[57] ABSTRACT

An oil cooled diesel engine piston is designed to restrict heat loss from the combustion chamber through provision of a combustion chamber insert defining a central non-oil-cooled chamber and a surrounding annular insulating air gap. The air gap controls heat flow primarily between the combustion gas exposed wall of the insert and an adjacent coolant exposed wall of the main piston volume.

The insert is press fitted into a recess in the main piston body and is positively locked therein by a retaining ring. A seal ring closes expansion clearance provided at the upper edge of the insert against significant gas flow into the insulating air gap. Insulating efficiency of the air gap is maximized by forming the gap with a thickness throughout a major portion of its extent of between about 0.040 and 0.060 inches.

Numerous additional features are also disclosed.

6 Claims, 3 Drawing Figures

4,253,430

INSULATED OIL COOLED PISTON ASSEMBLY

TECHNICAL FIELD

This invention relates to pistons for internal combustion engines and particularly diesel engines. In its more particular aspects, the invention provides an oil cooled insulated piston assembly for application especially to diesel type internal combustion engines.

Certain features of the subject matter disclosed herein are claimed in U.S. patent application Ser. No. 002,539 filed contemporaneously herewith in the names of Robert F. Garter, Nshan Hamparian and Litton T. Lee and assigned to the assignee of the present invention.

BACKGROUND

Historically, a significant portion of piston design and development work for diesel engines has involved ways to minimize piston metal temperatures through various cooling arrangements such as incorporating cast cooling passages in critical temperature areas, jet spray and splash cooling of the piston undercrown, entrapment of a cooling medium in "cocktail shaker" cavities for cyclic impingement on the piston inside surface, and so forth. Such arrangements have been aimed at increasing heat transfer from critical areas of the piston metal to minimize piston temperatures and decrease thermal stress levels to values compatible with material yield strengths.

In a contrary vein, some work has also been done to provide pistons with insulating means for limiting the loss of heat from the combustion chamber area to other portions of the engine. Such arrangements have been proposed for increasing engine operating efficiency by reducing lost heat as well as, in some cases, to improve combustion and reduce undesirable exhaust emissions.

While extensive commercial use has been made of oil cooled high output diesel engines pistons of the sort first referred to, it is believed that few, if any, satisfactory commercial embodiments of insulated combustion heat saving pistons have been utilized.

SUMMARY OF THE INVENTION

The present invention provides an insulated oil cooled piston assembly having oil cooled portions of the main body in the piston ring areas together with a high temperature combustion chamber defining insert insulated in part from the cooled portions of the piston by formation of a central enclosed non-oil-cooled chamber under the central portion of the combustion chamber and a controlled thickness insulating air gap between outer portions of the combustion chamber insert wall and the cooled walls of the main piston body.

Various features of the novel piston construction include specific configurations of main piston body and corresponding insert, retaining means for the combustion bowl insert including provision of a safety snap ring, seal means for the expansion clearance portion of the combustion bowl insert which seals the insulating air gap, high temperature material selection for the combustion bowl insert member, selection of a preferred thickness for the insulating air gap and others. These and other features and advantages will be more fully understood from the following description of certain preferred embodiments of the invention, taken together with the accompanying drawing.

BEST MODE FOR CARRYING OUT THE INVENTION

Figure 1:
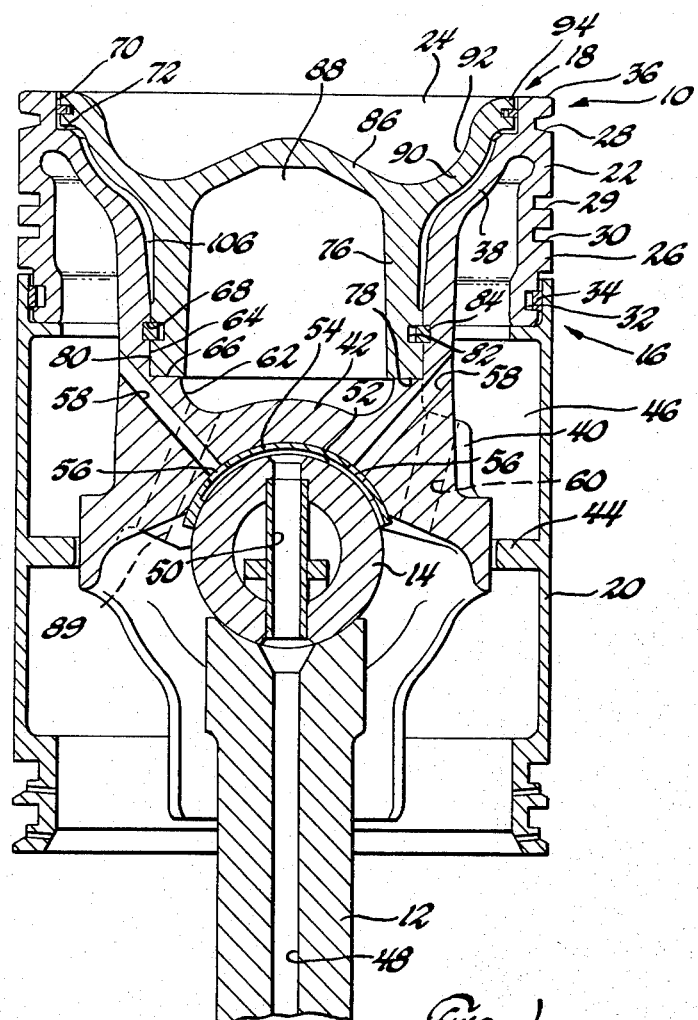
FIG. 1 is a cross-sectional view of a diesel engine crosshead type piston assembly together with an associated piston pin and connecting rod all in accordance with the present invention.

Referring now to the drawing in detail, there is shown a piston-connecting rod assembly generally indicated by numeral 10. Assembly 10 includes a connecting rod 12, the lower end of which has been deleted to simplify the drawing, a piston pin 14 and a piston assembly generally indicated by numeral 16. The piston assembly includes two primary elements—a head assembly 18 and a skirt, or crosshead, member 20.

The piston of the assembly so far described is of the crosshead type in which the skirt and the head assembly are separately connected with the piston pin and are free to oscillate a limited amount independently of one another around the piston pin axis. The arrangement and operation of these basic elements is generally similar to that of the crosshead piston construction disclosed in U.S. Pat. No. 3,555,972 Hulsing, which is assigned to the assignee of the present invention.

The piston of the present invention differs from the prior arrangement just referred to primarily in the construction of its head assembly 18. This assembly is formed of two main elements—a body member 22 and a combustion bowl insert member 24.

The body member 22 includes an outer generally cylindrical ring belt section 26 having grooves 28, 29, 30 for compression piston rings and, in a reduced diameter portion at its lower edge, a seal ring groove 32. In the latter is received a seal ring 34 that engages the inner side of the piston skirt upper edge to seal against the leakage of cooling oil from the interior of the piston in the same manner as in the piston of the previously mentioned patent.

At its upper edge, the ring belt section 26 of the body member forms an outer rim 36 and is connected immediately below the rim with a depending cup-shaped supporting wall 38 formed integral with a piston pin connecting section 40 below the wall. The pin connecting section 40 includes a pin receiving saddle portion 42 which extends outwardly at its edges into close clearance with an annular rib 44 of the piston skirt to substantially close the bottom edge of an annular cooling oil cavity 46 formed partly within the piston body member between its ring belt section 26 and cup-shaped wall 38 and partly between the lower portions of the wall 38, saddle portion 42 and the piston skirt 20.

The cooling oil cavity 46 is supplied with cooling oil via a lubricant passage 48 in the connecting rod 12 which connects with a tubular conduit 50 in the piston pin. This in turn supplied oil to an arcuate recess 52 in the bearing insert 54 received in the piston saddle portion, the recess in turn connecting through openings 56 with drilled passages 58 extending through the saddle portion from the bearing insert angularly outward to the coolant cavity 46.

The coolant supplied to the cooling oil cavity is utilized in known manner to cool the piston outer walls including the body member ring belt section 26 and the upper portions of the piston skirt 20. Excess oil is returned from the coolant cavity to the engine sump through one or more return passages 60 extending through the outer part of the saddle portion 42 and connecting the cavity with the open portion of the piston assembly below the saddle.

inwardly of the annular coolant cavity, the wall 38 of the piston body member defines a cup-shaped recess 62 which is closed at the bottom by the top of the piston saddle portion. The recess 62 is partially machined with a lower cylindrical surface 64 adjoining a flat annular seat or abutment 66 which adapt the recess to receive an axially symmetrical insert. An inwardly facing snap ring groove 68 is provided in the cylindrical surface 64 for a purpose to be subsequently described.

Upwardly of the wall 38, the inner portion of the piston rim is also machined with an inwardly facing cylindrical recess 70 and an adjacent flat annular surface 72 for purposes which will subsequently be made clear.

Within the recess 62 there is inserted a separate combustion bowl insert member 24 having a depending columnar section 76 with an open bottom received against the closed bottom of the recess. The lower portion of the columnar section is machined to form a flat annular surface 78 which seats against the seat or abutment 66 of the body member and an outwardly facing cylindrical surface 80 which is interference fitted or press fitted into the machined cylindrical surface portion 64 to retain the combustion bowl member in position. For a secondary positive retention means, the columnar section is also provided with an outwardly facing ring groove 82 in which is installed a snap ring 84 that, upon installation of the combustion bowl insert within the body, snaps outwardly into engagement with the cooperating ring groove 68 of the body member to positively prevent disengagement of the combustion bowl insert from the body member.

Upwardly of the columnar section 76, the combustion bowl member defines a central bowl section 86 that extends inwardly from the upper edge of the columnar section to close the top thereof and enclose a central chamber 88 that is not directly cooled by coolant in the cooling oil cavity 46. The central chamber 88 is vented to the open lower portion of the piston by one or more passages 89 which extend through the outer part of the saddle portion 42 of the piston body member. This provides the central chamber 88 with a small amount of cooling through expansion and contraction of gases within the cavity. This breathing action helps control overheating of the otherwise uncooled central wall of the combustion bowl insert.

The combustion bowl member further includes a peripheral bowl section 90 that extends outwardly and upwardly from the columnar section, forming the outer edges of a recessed combustion bowl 92 and extending to an edge portion 94 having a machined cylindrical outer surface 96 and a machined downwardly facing flat annular surface 98 which respectively extend in closely spaced opposing relation to the cylindrical surface 70 and flat annular surface 72 of the piston body rim. The clearance thus formed is sealed by an annular seal ring 100 disposed within an outwardly facing ring groove 102 centered in the outer surface of the edge portion 94. A ring expander 104 is preferably provided to urge the piston ring 100 into engagement with the cylindrical surface 70 of the body member to positively seal the gap.

Together, the peripheral bowl section 90 and the columnar section 76 define a continuous outwardly and upwardly flared inner wall which extends generally parallel to the body member supporting wall 38. These walls are in engagement at their lower ends and extend in close clearance with one another at their upper ends where the clearance is sealed by a seal ring. The portions intermediate the ends are spaced apart to define an insulating air gap 106 provided to limit heat loss from the combustion bowl member to the oil cooled wall 38 of the body member. The thickness of the air gap is preferably held to a nominal dimension of about 0.050 inches or within a preferred range of from about 0.040 to 0.060 inches throughout the major portion of the extent of the air gap. Calculations subsequently discussed indicate that this range of gap thickness provides the most effective insulating value, minimizing the combination of conductive and convective heat transfer under the anticipated conditions of piston operation.

Alternative Embodiment

Figure 2:
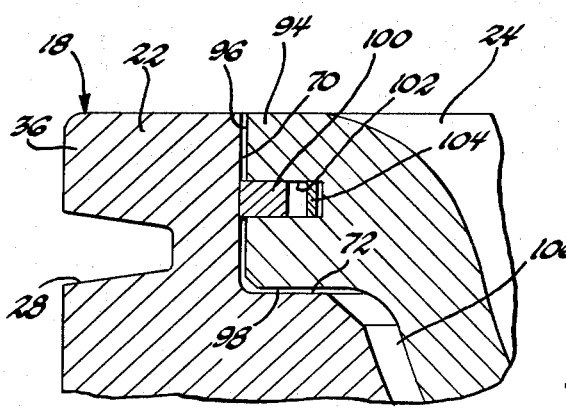
FIG. 2 is an enlarged cross-sectional view of a portion of the rim section of the piston of FIG. 1 showing the combustion bowl insert clearance and sealing arrangement.
Figure 3:
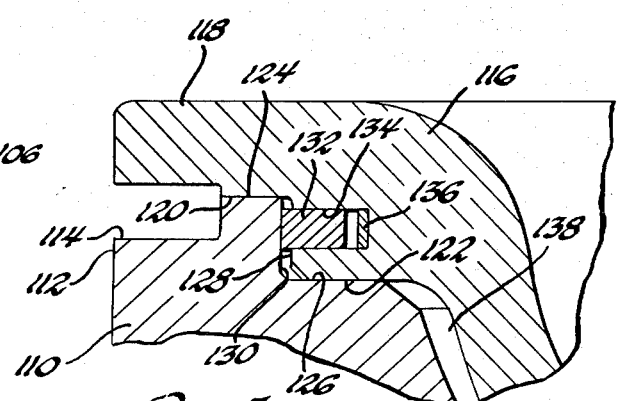
FIG. 3 is an enlarged cross-sectional view similar to FIG. 2 but showing an alternative embodiment of piston rim configuration.

FIG. 3 shows an enlarged view of the rim section of an alternative piston embodiment which in other respects is like the embodiment of FIGS. 1 and 2. The construction differences shown in FIG. 3, as compared to the similar portion of the first embodiment shown in FIG. 2, includes providing a piston body member 110 that extends at its outer edge 112 only up to about the center of the first ring groove 114. Over this the combustion bowl insert member 116 extends, providing an outer rim portion 118 in which the upper portion of the ring groove is machined.

Inwardly of and below this rim, the bowl insert member is provided with concentric longitudinally spaced flat annular surfaces 120, 122 which seat against and oppose corresponding flat annular surfaces 124 and 126 of the body member. Intermediate these opposed pairs of surfaces are opposed cylindrical surfaces 128, 130 of the insert and body member respectively. These surfaces define a clearance gap that is closed by a seal ring 132 received in a groove 134 of the insert member and expanded by an expander 136 in the same manner as indicated for the first described embodiment.

In the embodiment of FIG. 3, the seal ring 132 operates in the same manner as that of the embodiment of FIGS. 1 and 2 to seal the clearance between the cylindrical surfaces 128, 130 and prevent the substantial transfer of gases into and out of the insulating air gap 138, provided below the closely spaced rim portions of the body member and bowl insert. Normally, upon installation, a small clearance will be provided between the opposed flat surfaces 120, 124 and 122, 126 as in the corresponding surfaces of the first described embodiment. However, this clearance is preferably made as small as is practical, consistent with the need to provide for seating of the bowl insert member against the body member in the central portion (not shown) of the piston, in order to avoid development of excessive stresses in the rim portion due to gas loads on the insert member during operation.

Air Gap Thickness

Because of its low conductivity, stagnant air provides an almost ideal thermal barrier, extensive use of which is made in various insulation applications. As applied to engine pistons, it is believed that proper use of an air gap can provide much greater insulating value with fewer practical operational difficulties than can be obtained with the use of ceramic coatings and inserts, to which so much developmental effort has been applied.

Selection of a proper range of thickness for the air gap requires evaluation of the piston design and the operational characteristics of the engine in which it is to be used with appropriate modeling procedures or practical assumptions to determine certain specific characteristics to be subsequently discussed. It is then possible to make use of the Grashof number, which is an accepted measure of free convection potential and is defined by the formula $$Gr = (\beta g b^3 \Delta T)/\nu^2$$

where:
Gr = the Grashof number
$\beta$ = the coefficient of thermal expansion of the air in the gap
g = the acceleration of gravity
b = air gap thickness
$\Delta T$ = differential temperature across the air gap
$\nu$ = kinematic viscosity of the air in the gap.

It has been theorized and confirmed by tests in a static fixture that for Grashof numbers greater than about 1500, convective heating begins to occur in the air gap, causing its insulating properties to be less effective. Thus, for maximum insulating value, the gap should be made as thick as possible without exceeding a Grashof number of about 1500. Since, however, heat transfer characteristics in a moving piston environment are considerably different than those of a static application, it is considered appropriate to replace the gravitational acceleration term g in the formula by the maximum piston acceleration $r\omega^2$ so that the formula reads $$Gr = (\beta r \omega b^3 \Delta T)/\nu^2$$

where r equals the crank radius, or one-half the piston stroke, and $\omega$ equals the engine crank speed in radians per second. Restating the above formula to calculate the desired air gap thickness we have $$b = \left( \frac{Gr\, \nu^2}{\beta\, r\, \omega^2\, \Delta T} \right)^{\frac{1}{3}}$$

Utilizing the foregoing formula to establish the desired air gap thickness for the above-described piston embodiment, preliminary modeling and subsequent engine testing established the following conditions for determination of the air gap. An estimated average air gap temperature of 650°, establishing a coefficient of thermal expansion ($\beta$) of $0.90 \times 10^{-3}$ per °F. and a kinematic viscosity ($\nu$) of $0.58 \times 10^{-3}$ feet$^2$ per second, a differential temperature ($\Delta T$) across the air gap of about 700° F., an engine speed of about 2100 rpm or $2\pi \times 2100/60$ radians per second, and an engine half stroke r of 2.5 inches. A Grashof number of 1500 was assumed as the point of ideal gap thickness.

Inserting these values in the foregoing formula yields a nominal gap thickness (b) of 0.052 inches. Thus, it is considered that, for the anticipated operating conditions, the ideal gap thickness falls within about 20 percent of the nominal value, or in a range of from about 0.040 to 0.060 inches. It should be apparent that the gap thickness may need to be varied at certain points of the construction due to other reasons such as required structural strength or limitation of material stresses. However, it is sufficient to obtain the desired purposes if a major portion of the air gap is designed to fall within the calculated desirable thickness range and this design concept is used in the piston of the preferred embodiment.

Obviously, where the piston operating conditions such as engine speed or operating temperature differ or where the piston design itself causes substantially different temperature conditions in the air gap, the optimum thickness value of the air gap will vary in accordance with the formula. However, it is in accordance with the invention to apply, in pistons of various designs and operating circumstances, insulating air gaps having ranges of thickness which are established within approximately 20% of the nominal thicknesses determined by the above-indicated formula.

Materials Selection

Although any suitable materials may be utilized in the construction of pistons according to the present invention, certain requirements must be met for satisfactory operation. The main structure of the piston must, of course, be made from material of adequate strength for the loads to be imposed thereon. Thus, in the preferred embodiment of the present invention, the body member of the piston is formed of a medium strength cast iron material known as ArmaSteel GM 85M. Because of the substantially higher temperatures reached by the combustion chamber defining bowl insert member 24, its material is chosen to provide a lower coefficient of expansion than the material of the body member. This avoids overexpansion of the bowl member sufficiently to close the radial clearance between it and the adjacent body member, even though the bowl member reaches significantly higher temperatures. Thus, the development to excessive stresses in the edge portion of the bowl member, which could cause premature failure, is avoided. The bowl material chosen for use in the preferred embodiment of this invention is Ni-Resist ductile iron type D5b.

The seal ring arrangement utilized between the outer edge of the bowl member and the piston body rim portion to seal the insulating air gap also requires consideration for selection of a proper material. It is necessary, in view of the temperatures reached, to use a material that will permit proper functioning of the ring under operating conditions. It is considered that any suitable high temperature material might be used, such as for example SAE 9254 tool steel, H13 tool steel or Inconel-X. However, in the preferred embodiment, the ring construction used included a plain ductile iron split ring expanded by a high temperature spring expander of the hump type formed from Inconel-X or an equivalent high temperature material.

While the invention has been disclosed by reference to certain preferred embodiments, it should be understood that numerous changes could be made within the spirit and scope of the inventive concepts disclosed. Accordingly, it is intended that the invention not be limited to the disclosed embodiments, but that it have the full scope permitted by the language of the following claims.

The embodiments of the invention in which an exclusive property or privilege is claimed are defined as follows:

1. An oil cooled piston assembly for an internal combustion engine, said assembly comprising a body member having an outer generally cylindrical ring belt section connected near its upper edge with a depending cup shaped supporting wall integral with a piston pin connecting section below said wall, said wall and said ring belt section defining an annular cooling oil cavity therebetween for receiving cooling oil to cool said ring belt section, said wall defining inwardly thereof a cup shaped recess having a closed bottom forward by said piston pin connecting section and adapted to receive an axially symmetrical insert, and a separate combustion bowl member received within said recess, said bowl member having a depending columnar section with an open bottom received against the bottom of said recess, a central bowl section extending inwardly from the upper edge of the columnar section and closing the top thereof to form a central chamber without direct cooling by coolant in said cooling oil cavity, and a peripheral bowl section extending outwardly and upwardly from said columnar section upper edge, said peripheral bowl and columnar sections together defining a continuous outwardly and upwardly flared inner wall generally parallel to said body member supporting wall, said walls being in engagement at their lower ends and spaced apart intermediate their ends to define an insulating air gap to limit heat loss from the combustion bowl member to the oil cooled wall of the body member.

2. A piston assembly as defined in claim 1 wherein said piston pin connecting section further includes a transverse pin receiving opening, oil distribution passages extending from said pin opening to said annular cooling oil cavity to distribute cooling oil thereto, a drain passage extending from said cooling oil cavity to a crankcase exposed area below said pin connecting section to drain excess cooling oil from said cooling oil cavity and a vent passage connecting said crankcase exposed area with said central chamber to ventilate said chamber to provide limited cooling to said central bowl section.

3. An oil cooled piston assembly for an internal combustion engine, said assembly comprising a body member having an outer generally cylindrical ring belt section connected near its upper edge with a depending cup shaped supporting wall integral with a piston pin connecting section below said wall, said wall and said ring belt section defining an annular cooling oil cavity therebetween for receiving cooling oil to cool said ring belt section, said wall defining inwardly thereof a cup shaped recess having a closed bottom formed by said piston pin connecting section and adapted to receive an axially symmetrical insert, and a separate combustion bowl member received within said recess, said bowl member having a depending columnar section with an open bottom received against the bottom of said recess, a central bowl section extending inwardly from the upper edge of the columnar section and closing the top thereof to form a central chamber without direct cooling by coolant in said cooling oil cavity, and a peripheral bowl section extending outwardly and upwardly from said columnar section upper edge, said peripheral bowl and columnar sections together defining a continuous outwardly and upwardly flared inner wall generally parallel to said body member supporting wall, said walls being in engagement at their lower ends and spaced apart intermediate their ends to define an insulating air gap to limit heat loss from the combustion bowl member to the oil cooled wall of the body member, said walls being spaced with close clearance near their upper ends and further including high temperature seal means between said walls at and substantially closing said close clearance to deter significant gas leakage into said insulating air gap.

4. A combination in accordance with either of claims 1 or 3 wherein said separate combustion bowl member is formed of a material having a significantly lower coefficient of thermal expansion than that of the material of the piston body member.

5. A combination according to either of claims 1 or 3 wherein said engaged lower ends of said walls include opposed cylindrical surfaces having mating snap ring grooves and a snap ring collapsible into the groove of said inner wall for assembly and expandable upon assembly to extend into both grooves and positively lock the combustion bowl member within said body member.

6. A combination according to claim 4 wherein said engaged opposed cylindrical surfaces of the body member recess and combustion bowl member columnar section are press fitted together to provide a locking force deterring disassembly of these components, said snap ring constituting a secondary positive retention device.

* * * * *

UNITED STATES PATENT AND TRADEMARK OFFICE
CERTIFICATE OF CORRECTION

PATENT NO. : 4,253,430
DATED      : March 3, 1981
INVENTOR(S) : Robert F. Garter, Nshan Hamparian It is certified that error appears in the above-identified patent and that said Letters Patent are hereby corrected as shown below:

Col. 6, line 41, "to" should read -- of --.

Col. 7, line 14, "forward" should read -- formed --.

*Signed and Sealed this*

*First* Day of *September 1981*

[SEAL]

*Attest:*

*Attesting Officer*

GERALD J. MOSSINGHOFF
*Commissioner of Patents and Trademarks*